(12) United States Patent
Moman et al.

(10) Patent No.: US 6,448,348 B1
(45) Date of Patent: Sep. 10, 2002

(54) PROCESS FOR POLYMERIZING OLEFINS WITH SUPPORTED ZIEGLER-NATTA CATALYST SYSTEMS

(75) Inventors: Akhlaq Moman; Atieh Abu-Raqabah; Orass Hamed; Raju Raghavan, all of Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 09/581,358

(22) PCT Filed: Oct. 13, 1999

(86) PCT No.: PCT/EP99/07785

§ 371 (c)(1),
(2), (4) Date: Jun. 9, 2000

(87) PCT Pub. No.: WO00/23481

PCT Pub. Date: Apr. 27, 2000

Related U.S. Application Data

(60) Provisional application No. 60/110,995, filed on Dec. 4, 1998, and provisional application No. 60/104,669, filed on Oct. 16, 1998.

(51) Int. Cl.$^7$ .............................. C08F 4/02; C08F 4/602; C08F 4/646; C08F 4/76
(52) U.S. Cl. ................................ 526/124.7; 526/124.2; 526/124.3; 526/125.7; 526/151; 526/153; 526/201; 526/904; 502/109
(58) Field of Search ....................... 502/109; 526/124.2, 526/124.3, 124.7, 201, 904, 125.7, 151, 153

(56) References Cited

U.S. PATENT DOCUMENTS

| | | | |
|---|---|---|---|
| 3,787,384 A | 1/1974 | Stevens et al. | |
| 4,173,547 A | 11/1979 | Graff | |
| 4,568,730 A | 2/1986 | Graves | |
| 4,876,229 A | 10/1989 | Furtek | |
| 4,900,706 A | 2/1990 | Sasaki et al. | |
| 4,940,682 A | 7/1990 | Sasaki et al. | |
| 4,983,694 A | 1/1991 | Furtek | |
| 5,006,618 A | 4/1991 | Miro | |
| 5,051,484 A * | 9/1991 | Sasaki et al. | ............... 526/151 |
| 5,118,648 A | 6/1992 | Furtek et al. | |

FOREIGN PATENT DOCUMENTS

| | | |
|---|---|---|
| FR | 1.529.845 | 11/1968 |
| WO | WO 97/48742 | 12/1997 |

* cited by examiner

Primary Examiner—David W. Wu
Assistant Examiner—R. Rabago
(74) Attorney, Agent, or Firm—Kramer Levin Naftalis & Frankel

(57) ABSTRACT

A catalytic polymerization process for preparing polymer products is provided. The polymerization process is either homopolymerization of olefins or copolymerization of olefins with alpha-olefins. The polymerization process is conducted in the presence of a solid catalyst precursor and a cocatalyst. The catalyst precursor includes a transition metal, a magnesium compound, an aluminum compound and a polyvinylchloride (PVC) support.

28 Claims, No Drawings

US 6,448,348 B1

PROCESS FOR POLYMERIZING OLEFINS WITH SUPPORTED ZIEGLER-NATTA CATALYST SYSTEMS

This application claims the benefit of U.S. Provisional application Nos. 60/104,669, filed Oct. 16, 1998 and 60/110,995, filed Dec. 4, 1998. The contents of U.S. Provisional application No. 60/104,669, filed Oct. 16, 1998 is incorporated by reference.

BACKGROUND OF THE INVENTION

1. Field of the Invention

The present invention relates to a process for polymerizing olefins of the formula $CH_2CHR$ in which R=H or a $C_1$–$C_{10}$ alkyl group, and copolymerizing said olefins with alpha olefins of $C_3$–$C_8$ carbons in a slurry or gas phase process using new Ziegler-Natta catalyst systems. More particularly, this invention relates to catalytic homopolymerization of ethylene and copolymerization of ethylene with alpha olefins using a catalyst which contains at least magnesium, aluminum and titanium chemically anchored on a polymeric material. The product polyethylene polymer and copolymers have a density of about 0.91 to 0.97, molecular weight of about 500 to 900,000 grams/mole, a very low level of fines, uniform spherical particles, very good thermal stability and excellent optical properties.

2. Description of the Prior Art

Several publications are referenced in this application. These references describe the state of the art to which this invention pertains, and are incorporated herein by reference.

The field of olefin polymerization catalysis has witnessed many remarkable discoveries during the last 50 years. In particular two broad areas of invention stand out. Firstly, the discovery of Ziegler-Natta catalysts in the 1950's, which are still being used extensively in the polyolefins industry. Secondly, and more recently, the discovery of the highly active metallocene-based catalysts. Since the discoveries of these systems, extensive research work was conducted in order to improve their performance.

However, despite the progress in these areas, there are still certain limitations as recognized by those of ordinary skill in the art. For example, conventional silica supported Ziegler-Natta catalysts often display limited activity, which reflects on the high catalyst residues. On the other hand, heterogeneous metallocene-based catalysts intrinsically possess high activity, though the catalyst precursors and, in particular the cocatalysts required for polymerization, such as aluminoxanes or borane compounds, are very expensive and troublesome in use. Further, another limitation that both catalyst systems share is the lengthy method of preparation and relatively high levels of fines generated in the polymers.

Traditionally, the active components of both Ziegler-Natta and metallocene catalysts are supported on inert carriers to enhance the catalyst productivity and to improve and control the product morphology. Magnesium chloride and silica have predominantly been used for the preparation of supported olefin polymerization catalysts.

U.S. Pat. No. 4,173,547 to Graff describes a supported catalyst prepared by treating a support, for example silica, with both an organoaluminum and an organomagnesium compound. The treated support was then contacted with a tetravalent titanium compound. In a simpler method, U.S. Pat. No. 3,787,384 to Stevens et al. discloses a catalyst prepared by first reacting a silica support with a Grignard reagent and then combining the mixture with a tetravalent titanium compound.

However, procedures typically used for the preparation of suitable magnesium chloride and silica supports such as spray drying or re-crystallization processes are complicated and expensive. Hence, all methods described in the aforementioned patents of catalyst preparation present the inconvenience of being complicated, expensive and do not allow consistency of particle size and particle size distribution. Also, despite the extensive and increasing use of the described supports for Ziegler-Natta catalysts, the support materials themselves have several deficiencies. For example, in the case of silica, high calcination temperatures are required to remove water, which is a common catalyst poison. This represents a significant proportion of the preparation of the catalyst. The use of silica as a support results in the support remaining largely in the product, which can affect product properties, such as optical properties or processability.

Certain polymeric materials have also been used for supporting titanium and magnesium compounds. However, most of the polymeric supports used so far have been based on polystyrene or styrene-divinylbenzene copolymers. U.S. Pat. No. 5,118,648 to Furtek and Gunesin describe a catalyst prepared using styrene-divinylbenzene as a polymeric support. The preparation of the catalyst was carried out by suspending the polymeric support in a solution of a magnesium dihalide or a magnesium compound capable of being transformed into a magnesium dihalide, for example, by titanium tetrachloride treatment, and subsequently evaporating the solvent. Hence, the active catalyst components were deposited on the polymeric support by physical impregnation. Other physical impregnation methods include those described in U.S. Pat. No. 4,568,730 to Graves whereby polymer resins of styrene-divinylbenzene are partially softened and the active catalyst components are homogeneously mixed in the resin to form a mass, which was subsequently pelletized or extruded into catalyst particles. However, the activity of the above-described polymer supported catalysts is not higher than that of metal oxide supported Ziegler-Natta catalysts.

Polypropylene and polyethylene have also found use as polymeric supports, where the polymeric material is typically ground with the catalyst components, which represents a difficult and complicated catalyst preparation procedure. In addition, there remains a significant concern as to the ability of the support material to retain the active species, deposited by physical impregnation, during polymerization conditions and thus generate, for example, fines. Hsu et al, Journal of Polymer Science: Part A: Polymer Chemistry, Vol. 32,2135 (1994), have used poly(ethylene-co-acrylic acid) as a support for Ziegler-Natta catalysts and the catalyst activity was found to be similar to that of the magnesium chloride supported catalyst.

OBJECTS OF THE INVENTION

It is an object of the invention to overcome the above-identified deficiencies.

It is another object of the invention to provide a process for the production of olefin homopolymers and copolymers, especially ethylene homopolymers and copolymers.

It is a further object of the invention to provide polymers having a very low level of fines. The foregoing and other objects and advantages of the invention will be set forth in or become apparent from the following description.

SUMMARY OF THE INVENTION

This present invention provides a process of making ethylene polymers and ethylene/alpha olefins ($C_3$–$C_8$)

copolymers in slurry or gas phase, having a wide density range of about 0.91 to 0.97 grams/cm³ and weight average molecular weight (Mw) of about 500 to 900,000 grams/mole and molecular weight distribution range of 2 to 10. The product ethylene homopolymers and copolymers have a uniform spherical particle morphology, very low level of fines and catalyst residues, improved thermal stability, excellent optical and better environmental stress cracking resistance (ESCR) than products made with other catalysts heretofore known in the art. The ethylene homopolymers and copolymers can be produced with the very highly active new Ziegler-Natta catalyst systems including at least a transition metal compound, a magnesium compound and an aluminum compound, chemically anchored on polymeric particles having labile active sites.

As a result of the present invention olefin and especially polyethylene polymers and copolymers are provided which have a density of from about 0.91 to about 0.97 grams/cm³ molecular weight of from about 500 to about 900,000 grams/mole, a very low level of fines, uniform spherical particles, very good thermal stability and excellent optical properties. Additionally, by using the process of the present invention copolymers of ethylene with alpha olefins are obtained at a productivity $\geq 1,000,000$ gm PE/gm Ti.

DETAILED DESCRIPTION OF THE INVENTION

The ethylene homopolymers and copolymers which may be prepared by the process of the present invention can have a wide density range of from about 0.91 to about 0.97 grams/cm³. The process of the present invention provides polyolefins, and preferably high density polyethylene and linear low density polyethylene. The density of the polymer at a given melt index, can be regulated by the amount of the alpha olefin ($C_3$ to $C_8$) comonomer used. The amount of alpha olefin comonomer needed to achieve the same density is varied according to the type of comonomer used. These alpha olefins can include propylene, 1-butene, 1-pentene, 4-methyl 1-pentene, 1-hexene, 1-heptene and 1-octene.

The average molecular weight (Mw) grams/mole of the polymers obtained in accordance with this invention ranges from 500 to 900,000 grams/mole or higher, preferably from 10,000 to 750,000 grams/mole, depending on the amount of hydrogen used, the polymerization temperature and the polymer density attained. The homopolymers and copolymers of the present invention have a melt index (MI) range of more than 0 and up to 100, preferably between 0.3 to 50.

The polydispersities, i.e., molecular weight distribution (MWD) of the produced polymers expressed as molecular weight/number average molecular weight of the polymer (Mw/Mn), is in the range of about 2 to 10. The polymer melt flow ratio (MFR) is another means of indicating MWD. The polymers of the present invention have an MFR in the range of about 15 to 60, preferably 20 to 40. Polymers having such a wide range of MFR are capable of being used in molding and film applications.

The polymers of the present invention are granular materials, uniform and spherical particles with an average particle size of about 0.1 to 4 mm in diameter, and a very low level of fines. The bulk density of the polymer ranges from 0.20 to 0.35 g/cm³.

The solid catalyst component (catalyst precursor) used in the present invention contains at least a transition metal compound, a magnesium compound, an aluminum compound and a polymeric material having a mean particle diameter of 5 to 1000 µm, a pore volume of 0.1 cm³/g or above and a pore diameter of from 20 to 10,000 Angstrom, preferably from 500 Å to 10,000 Å and a surface area of from 0.1 m²/gm to 100 m²/gm, preferably from 0.2 m²/gm to 15 m²/gm.

The transition metal compound used for the synthesis of the solid catalyst component in the invention is represented by the general formula $M(OR^1)_n X_{4-n}$, wherein M represents a transition metal of Group IVA, VA, VIA, VIIA or VIII of the Periodic Table of the Elements, $R^1$ represents a alkyl group having 1 to 20 carbon atoms, X represents a halogen atom and n represents a number satisfying $0 \leq n \leq 4$. Non-limiting examples of the transition metal are titanium, vanadium, or zirconium. Examples of $R^1$ include alkyl groups such as methyl, ethyl, n-propyl, isopropyl, n-butyl and the like.

Preferred examples of the above mentioned transition metal compounds include the following: titanium tetrachloride, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride, vanadium tdichloride, vanadium tetrachloride, vanadium oxytrichloride, and zirconium tetrachloride.

The magnesium compound used for the catalyst synthesis in the invention include Grignard compounds represented by the general formula $R^2MgX$, wherein $R^2$ is an alkyl group of 1 to 20 carbon atoms and X is a halogen atom. Other preferred magnesium compounds are represented by the general formula $R^3R^4Mg$, wherein $R^3$ and $R^4$ are each an alkyl group of 1 to 20 carbon atoms.

Preferred examples of the above mentioned magnesium compounds include the following: diethylmagnesium, dibutylmagnesium, butylethylmagnesium, dihexylmagnesium, butyloctylmagnesium, ethylmagnesium chloride, butylmagnesium chloride, hexylmagnesium chloride and the like and mixtures thereof.

These magnesium compounds described above may also be used in catalyst preparation as a mixture with an organoaluminum compound. Examples of organoaluminum compounds include trialkylaluminium such as trimethylaluminum triethylaluminum, triisobutylaluminum, trihexylaluminum and the like and mixtures thereof, and alkylalumoxanes such as methylalumoxane, ethylalumoxane and the like. The mixture of the magnesium compound and the organoaluminum compound in this invention can be used with a Mg:Al molar ratio of 99:1 to 50:50, and preferably 98:2 to 80:20 and more preferably 96:4 to 85:15.

The polymer particles used as supports in the present invention are in the form of distinct spherical particles, on which the active catalyst component is chemically bonded, wherein the ratio of active catalyst component to polymeric support is less than 3% by weight, preferably less than 1% by weight, more preferably less than 0.7% by weight. In contrast, catalysts prepared in the prior art using polymeric materials relied on physical impregnation of the catalyst active sites on the polymeric materials.

The polymer particles used in the present invention have a spherical shape with a particle diameter of 5 to 800 µm, preferably 10 to 600 µm, and more preferably 15 to 500 µm, a pore diameter of 20 to 10,000 Angstroms, preferably from 500 Å to 10,000 Å, surface area of from 0.1 m²/gm to 100 m²/gm, preferably from 0.2 m²/gm to 15 m²/gm, a pore volume of 0.1 cm³/g or above, preferably 0.2 cm³/g or above, and a molecular weight in the range of 5,000 to 200,000 g/mole. Uniformity of particle size is not critical and in fact catalyst supports having nonuniform particle sizes are preferred. By way of example and not as a limitation, for a catalyst support having a median particle size of 65 microns, it is preferred that at least 10% of the support particles have a diameter of greater than 85 microns, and at least 10% of the support particles have a diameter of less than 45 microns.

Examples of the polymeric supports used in the catalyst preparation of the present invention include polymer beads made of thermoplastic polymers. Polymer supports made of polyvinylchloride are preferred, and non-cross linked polyvinylchloride particles are most preferred.

The polymer particles used in the present invention have surface active sites such as labile chlorine atoms. Preferably, these active sites are reacted stoichiometrically with the organometallic compound, namely a magnesium containing compound and/or an aluminum containing compound.

The use of the polymer particles mentioned in the catalyst preparation of the invention offers significant advantages over traditional olefin polymerization catalysts using supports such as silica or magnesium chloride. In comparison to the silica supported catalyst, the polymer particles described in catalyst preparation of the invention require no high temperature and prolonged dehydration steps prior to their use in catalyst synthesis, thereby simplifying the synthesis process and thus reducing the overall cost of catalyst preparation. Furthermore, the cost of the polymeric support used in the present invention is substantially cheaper than silica or magnesium chloride supports. In addition, the catalyst in the present invention uses significantly lower levels of catalyst components for catalyst precursor preparation than silica or magnesium chloride supported catalysts. Also, the catalyst in the present invention is more active than conventional silica or magnesium supported Ziegler-Natta catalysts and supported metallocene catalysts. It has been unexpectedly found that the catalyst compositions of the present invention have an activity of more than 60,000 g polyethylene per mmol of titanium per 100 psi per hour, thereby providing polymers of superior clarity.

According to one embodiment of the present invention, polyvinyl chloride is used in the synthesis of the solid catalyst component. The synthesis of the solid catalyst component in the present invention involves introducing the polymeric material described above into a vessel and adding a diluent. Suitable diluents include isopentane, hexane, cyclohexane, heptane, isooctane and pentamethylheptane and mixtures thereof. The polymeric material is treated with either a magnesium compound described above or a mix of a magnesium compound and aluminum compound of the type described above at a temperature in the range of 20° C. to 150° C., preferably 50° C. to 110° C. The ratio of organometallic compound to the polymer support can be in the range of 0.05 mmol to 20 mmol per gram polymer, preferably 0.1 mmol to 10 mmol per gram polymer, and more preferably 0.2 mmol to 2 mmol per gram polymer.

The magnesium or magnesium-aluminum modified polymeric material is then treated with a transition metal compound of the type described above at a temperature in the range of 20° C. to 150° C., preferably 50° C. to 110° C. According to this invention, $TiCl_4$, $TiCl_3$, $Ti(OC_2H_5)_3Cl$, $VCl_4$, $VOCl_3$, $ZrCl_4$, $ZrCl_3(OC_2H_5)$ are preferred transition metal compounds, $TiCl_4$, and $ZrCl_4$ are more preferred. The produced solid catalyst component is washed with a suitable solvent such isopentane, hexane, cyclohexane, heptane, isooctane and pentamethylheptane, preferably isopentane or hexane. The solid catalyst component is dried using a nitrogen purge at a temperature in the range of 20° C. to 100° C., preferably 30° C. to 80° C.

The free-flowing solid particulate catalyst is activated with suitable activators, also known as cocatalysts or catalyst promoters. The activation process can be a one step in which the catalyst is fully activated in the reactor, or two steps, in which the catalyst is partially activated outside the reactor and the complete activation occurs inside the reactor. The preferred compounds for activation of the solid catalyst component are organoaluminum compounds.

The organoaluminum compounds which can be used as activators in the present invention along with the solid catalyst component are represented by the general formulas $R^5_n AlX_{3-n}$ or $R^6R^7Al$—O—$AlR^8R^9$, where $R^5$, $R^6$, $R^7$, $R^8$, and $R^9$, each represent an alkyl group having 1 to 20 carbon atoms, such as a hydrocarbon; X represents a halogen atom or an alkyl group; and n represents a number satisfying $0 \leq n \leq 3$. Illustrative but not limiting examples of organoaluminum compounds include triethylaluminum (TEAL), triisobutylaluminum (TIBA), tri n-hexylaluminum (TnHAL), diethylaluminum chloride, methylalumoxane, ethylalumoxane, and mixtures thereof. The organoaluminum compound in this invention can be used in the range of from 1 to 1500 moles per one mole of transition metal in the said catalyst, and more preferably in the range of 10 to 800 moles per one mole of transition metal.

EXAMPLES

The following examples are intended to be illustrative of this invention. They are, of course, not to be taken to limit in any way the scope of this invention. Numerous changes and modifications can be made with respect to the invention.

Test Methods

The properties of the polymers produced in the following examples were determined by the following test methods:

Density was measured using ASTM D method and reported as gram/cm$^3$. Melt Index (MI), $I_2$ was determined using ASTM 1238—condition F measured at 190° C. and reported as gram per 10 minutes. Melt Flow Index (MFI), $I_{21}$ was determined using ASTM 1238—condition F measured at 190° C. and at 10 times the weight used in the MI method. Melt Flow Ratio (MFR) is the ratio between MFI to MI ($I_{21}/I_2$). Average molecular weight (Mw), number average molecular weight (Mn), and molecular weight distribution (MWD) were measured at 135° C. by Size Exclusion Chromatography (SEC) using mixed mode columns and trichlorobenzene as solvent. Melting point, crystallinity were determined by Differential Scanning Calorimetry (DSC). Oxygen induction time (OIT) was measured for unstabilized polymers at 200° C. by DSC.

Example 1

Synthesis of Catalyst A

I. Synthesis of Butyl Magnesium Chloride (Grignard Reagent)

A three-necked round bottom flask, equipped with a nitrogen inlet, a thermometer, a reflux condenser and a dropping funnel, was purged with nitrogen for 30 minutes at 110° C. and then 12 g of magnesium turnings were added to the flask. A crystal of iodine was added, followed by 255 cm$^3$ of dibutylether. Then 53.0 cm$^3$ of butylchloride was gradually added to the flask over a period of 45 minutes, while stirring and maintaining the temperature at 105° C.

The resulting mixture in the flask was stirred for 90 minutes after the completion of butylchloride addition at 105° C. Then 400 cm³ of n-heptane was added and stirring was carried out for a further period of 90 minutes at 105° C. The reaction mixture was cooled to room temperature, and the solid matter was filtered off.

A sample of the butylmagnesium chloride solution was analyzed using a Mettler Autotitrator. Thus, the concentration of n-butyl magnesium chloride was determined to be 0.68 M.

II. Catalyst Synthesis

In a three-necked round bottom flask, equipped with a condenser and stirrer, was placed 5.0 g of polyvinylchloride (supplied by SABIC, Saudi Arabia) spheres of 103 μm average particle size. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm³ of heptane. Then 15.4 cm³ of a mixture of butylmagnesium chloride and triethylaluminum, with a magnesium to aluminum ratio of 90 to 10, was added to the slurry at 70° C. and the resultant mixture was stirred for 60 minutes at 70° C. The stirring was then stopped and the supernatant liquid was removed by cannula. The resulting solid was washed by stirring with 100 cm³ of heptane and then the solvent was removed by cannula, and the washing step was repeated with an additional amount of 100 cm³ of heptane.

Then the modified polyvinylchloride was slurried using 30 cm³ of heptane, and stirred with 10cm³ of a one molar titanium tetrachloride solution in heptane at 70° C. for 60 minutes. The supernatant liquid was decanted and the resulting solid product was washed by stirring with 100 cm³ of heptane and then the heptane was removed, then the solid product was washed again with 100 cm³ of isopentane, and then washed three more times with 75 cm³ of isopentane. Finally, the solid catalyst was dried using a nitrogen purge for thirty minutes to yield a free-flowing brown colored solid product. The solid catalyst component was analyzed by atomic adsorption spectroscopy and was found to contain 0.2% by weight of titanium atoms, 1.0% by weight of magnesium atoms and 0.05% by weight of aluminum atoms.

Then 6 cm³ of butylmagnesium chloride was added to the slurry at 70° C. and the resultant mixture was stirred for 60 minutes at 70° C. The stirring was then stopped and the supernatant liquid was removed by cannula. The resulting solid was washed by stirring with 100 cm³ of heptane and then the solvent was removed by cannula, and the washing step was repeated with a further amount of 100 cm³ of heptane.

Then the modified polyvinylchloride was slurried using 30 cm³ of heptane, and stirred with 5 cm³ of a one molar titanium tetrachloride solution in heptane at 70° C. for 30 minutes. The supernatant liquid was decanted and the resulting solid product was washed by stirring with 100 cm³ of heptane and then the heptane was removed, then the solid product was washed again with 100 cm³ of isopentane, and then washed three times with 75 cm³ of isopentane. Finally, the solid catalyst was dried using a nitrogen purge for thirty minutes to yield a free-flowing brown colored solid product. The solid catalyst component was found to contain 0.27% by weight of titanium atoms and 0.52% by weight of magnesium atoms.

Examples 3–6

Ethylene Homopolymerization

An autoclave with a volume of 2 liters was purged with nitrogen at 180° C. for 30 minutes. After cooling the autoclave to 60° C., one liter of hexane was introduced into the reactor, followed by purging with hydrogen. Then the desired quantity of triethylaluminum was introduced to the reactor, followed by 0.1 g of the solid catalyst "A" described in Example 1. The reactor temperature was raised to 80° C. and the hydrogen pressure was then adjusted until the pressure reached 3 bar. Ethylene was introduced to the reactor such as to raise the reactor pressure to 15 bar, and polymerization was carried out for 1 hour, with ethylene supplied on demand to maintain the total reactor pressure at 15 bar. Polymer yield, catalyst activity, and polymer properties are listed in Table 1 below.

TABLE 1

Polymerization and Polymer Properties
Activity (g PE/mmol Ti.hr. 100 psi)

| Ex. | TEAL (mmol) | Yield (g PE) | Activity (g PE/mmol. Ti.hr. 100 psi) | MI (g/10 min) | MFI | MFR | MW (1000 g/mol) | MN (1000) | MWD | DSC Mpt/° C. | DSC % Crystallinity | DSC OIT/min @ 200° C. | Density (g/cm³) |
|---|---|---|---|---|---|---|---|---|---|---|---|---|---|
| 3 | 1.2 | 160 | 21915 | 0.32 | 8.8 | 27.6 | 142 | 39.3 | 3.60 | 138.0 | 83.0 | 0.92 | 0.9556 |
| 4 | 1.8 | 267 | 36909 | 0.56 | 15.9 | 27.9 | 122 | 32.9 | 3.69 | 138.0 | 84.0 | 0.85 | 0.9560 |
| 5 | 2.4 | 273 | 37486 | 0.81 | 23.3 | 28.1 | 121 | 31.0 | 3.89 | 138.0 | 86.0 | 0.85 | 0.9600 |
| 6 | 3.0 | 249 | 34602 | 0.95 | 26.2 | 28.8 | 117 | 32.9 | 3.56 | 138.0 | 87.0 | 0.90 | 0.9600 |

Example 2

Synthesis of Catalyst B

In a three-necked round bottom flask, equipped with a condenser and stirrer, was placed 6.0 g of polyvinylchloride (supplied by SABIC, Saudi Arabia) spheres of 103 μm average particle size. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 cm³ of heptane.

Examples 7–9

Ethylene Homopolymeriztion

Polymerizations were carried out as described in Examples 3–6, at various hydrogen pressures using a 2.4 mmol of triethylaluminum (TEAL). Polymer yield, catalyst activity, and polymer properties are listed in Table 2 below.

TABLE 2

Polymerization and Polymer Properties
Activity (g PE/mmol Ti.hr. 100 psi)

| Ex. | $H_2$ (bar) | Yield (g PE) | Activity (g PE/mmol. Ti.hr. 100 psi) | MI (g/10 min) | MFI | MFR | MW (1000 g/mol) | MN (1000) | MWD | DSC Mpt/° C. | DSC % Crystallinity | DSC OIT/min @ 200° C. | Density (g/cm³) |
|---|---|---|---|---|---|---|---|---|---|---|---|---|---|
| 7 | 3.0 | 267 | 36909 | 0.56 | 15.9 | 27.9 | 122 | 32.9 | 3.69 | 138.0 | 84.0 | 0.85 | 0.9556 |
| 8 | 2.4 | 288 | 37284 | 0.44 | 12.5 | 28.4 | 143 | 36.2 | 3.94 | 138.0 | 87.0 | 0.91 | 0.9554 |
| 9 | 1.4 | 368 | 43589 | 0.08 | 2.5 | 32.5 | 204 | 59.4 | 3.43 | 138.0 | 86.0 | 1.02 | 0.9532 |

Examples 10–13

Ethylene/1-butene Copolymerization

Polymerizations were carried out as described in Examples 3–6, at various 1-butene concentrations using 0.06 g of the solid catalyst "A" described in Example 1, a hydrogen pressure of 1.4 bar, and 1.8 mmol of TEAL. Polymer yield, catalyst activity, and polymer properties are listed in Table 3 below.

TABLE 3

Copolymerization and Polymer Properties

| Ex. | 1-Butene/ cm³ | Yield (g PE) | Activity (g PE/mmol. Ti.hr. 100 psi) | MI (g/10 min) | MFI | MFR | MW (1000 g/mol) | MN (1000) | MWD | DSC Mpt/° C. | DSC % Crystallinity | DSC OIT/min @ 200° C. | Density (g/cm³) |
|---|---|---|---|---|---|---|---|---|---|---|---|---|---|
| 10 | 0 | 218 | 43509 | 0.06 | 1.73 | 28.8 | 225 | 61.6 | 3.65 | 140.0 | 80.0 | 0.94 | 0.9530 |
| 11 | 5 | 224 | 44707 | 0.09 | 2.60 | 27.9 | 197 | 56.1 | 3.51 | 138.0 | 76.0 | 0.96 | 0.9482 |
| 12 | 10 | 238 | 47501 | 0.12 | 2.73 | 22.7 | 187 | 55.0 | 3.39 | 138.0 | 73.0 | 0.93 | 0.9464 |
| 13 | 20 | 194 | 38720 | 0.18 | 0.18 | 27.7 | 162 | 47.2 | 3.43 | 136.0 | 73.0 | 0.93 | 0.9448 |

Examples 14–16

Ethylene Homopolymerization

Polymerizations were carried out as described in Examples 3–6, with different aluminum alkyls using 0.125 g of catalyst "B" described in Example 2, at a hydrogen pressure of 2.5 bar, with 6.0 mmol of aluminum alkyl and at a total reactor pressure of 20 bar. Polymer yield, catalyst activity, and polymer properties are listed in Table 4 below.

TABLE 4

Polymerization and Polymer Properties
Activity (g PE/mmol Ti.hr. 100 psi)

| Ex. | Aluminum Alkyl | Yield (g PE) | Polymerization Time/min | Activity (g PE/mmol. Ti.hr. 100 psi) | MI (g/10 min) | MFI | MFR | MW (1000 g/mol) | MN (1000) | MWD |
|---|---|---|---|---|---|---|---|---|---|---|
| 14 | TEAL | 190 | 60 | 10561 | 0.31 | 9.3 | 30 | 169 | 33.7 | 5.0 |
| 15 | TIBA | 265 | 20 | 44235 | 0.40 | 8.8 | 22 | 171 | 33.2 | 5.1 |
| 16 | TnHAL | 384 | 20 | 64099 | 0.35 | 8.0 | 23 | 161 | 34.1 | 4.7 |

Examples 17–19

Ethylene Homopolymerization

Polymerizations were carried out as described in Examples 14–16, at various polymerization temperatures using catalyst "B" and 2.5 mmol of TEAL. Polymer yield, catalyst activity, and polymer properties are listed in Table 5 below.

TABLE 5

Polymerization and Polymer Properties
Activity (g PE/mmol Ti.hr. 100 psi)

| Ex. | Temp./ °C. | Yield (g PE) | Polymerization Time/min | Activity (g PE/mmol. Ti.hr. 100 psi) | MI (g/10 min) | MFI | MFR | MW (1000 g/mol) | MN (1000) | MWD |
|---|---|---|---|---|---|---|---|---|---|---|
| 17 | 85 | 280 | 50 | 18684 | 0.41 | 8.9 | 21.7 | 181 | 36.4 | 5.0 |
| 18 | 90 | 289 | 50 | 19285 | 0.23 | 8.8 | 38.0 | 170 | 39.0 | 4.4 |
| 19 | 95 | 325 | 40 | 27126 | 0.22 | 9.2 | 40.0 | 173 | 36.0 | 4.8 |

We claim:

1. A process for homopolymerization of an olefin or copolymerization of at least one olefin with one alpha-olefin to produce polymers which comprises contacting the olefin or the olefin and alpha-olefin with a catalyst composition in the presence of a cocatalyst, said catalyst composition prepared according to a process comprising:
   (a) treating PVC-based particles with a mixture of an organomagnesium compound and an organoaluminum compound in an inert organic solvent; and
   (b) contacting said treated PVC-based particles of step (a) with a transition metal compound selected from the group consisting of $TiCl_4$, $VCl_4$, and $ZrCl_4$ in the absence of an electron donor.

2. The process of claim 1, wherein said transition metal compound is $TiCl_4$.

3. The process of claim 1, wherein said PVC-based particles of (a) are contacted with said transition metal compound of (b) under conditions sufficient to form chemical bonding between said transition metal compound and said treated PVC-based particles.

4. The process of claim 1, wherein said mixture of said organomagnesium compound and said organoaluminum compound has a molar ratio of Mg:Al from 99:1 to 50:50.

5. A process for homopolymerization of ethylene or copolymerization of ethylene and an alpha-olefin to produce HDPE or LLDPE comprising contacting ethylene with a catalyst composition in the presence of a cocatalyst, said catalyst composition prepared according to a process comprising:
   (a) treating PVC-based particles with a mixture of an organomagnesium compound and an organoaluminum compound in an inert organic solvent; and
   (b) contacting said treated PVC-based particles of (a) with $TiCl_4$, in the absence of an electron donor.

6. A process for homopolymerization of at least one olefin or copolymerization of an olefin with one alpha-olefin to produce polymers and copolymers which comprises contacting the olefin or the alpha-olefin with an active catalyst composition in the presence of a cocatalyst, said catalyst composition consisting essentially of a transition metal compound having the formula $M(OR^1)_nX_{4-n}$, wherein M is a transition metal of Group IVA, VA, VIA, VIIA or VIII of the Periodic Table .of the Elements, $R^1$ is an alkyl group having 1 to 20 carbons, X is a halogen and n is a number satisfying 0<n<4, an organomagnesium compound, and an organoaluminum compound, wherein said active catalyst composition is chemically bonded onto a support comprising PVC-based polymeric particles to form a supported catalyst system, and said active catalyst composition is less than 1.0% by weight of the catalyst system.

7. A process for copolymerization of ethylene with an alpha-olefin which comprises contacting ethylene and alpha-olefin with a catalyst precursor in the presence of a cocatalyst under conditions sufficient to form a copolymer, said catalyst precursor prepared by a process comprising:
   (a) treating a slurry of PVC-based particles in an inert hydrocarbon solvent with a mixture of an organomagnesium compound and an organoaluminum compound under conditions sufficient to form magnesium and aluminum-modified PVC-based particles, wherein said organomagnesium compound is selected from the group consisting of diethylmagnesium, dibutylmagnesium, butylethylmagnesium, dihexylmagnesium, ethylmagnesium chloride, butylmagnesium chloride, hexylmagnesium chloride and mixtures thereof, and said organoaluminum compound is selected from the group consisting of trimethylaluminum, triethylaluminum, triisobutylaluminum, trihexylaluminum, methylalumoxane, ethylalumoxane and mixtures thereof;
   (b) slurrying said treated PVC-based particles of (a) in an inert hydrocarbon solvent selected from the group. consisting of isopentane, hexane, cyclohexane, heptane, isooctane, pentamethylheptane and mixtures thereof;
   (c) adding to the slurry of (b) a transition metal compound selected from the group consisting of $TiCl_4$, $VCl_4$, and $ZrCl_4$.

8. The process of claim 7, wherein said transition metal compound is $TiCl_4$ and said mixture of said organomagnesium compound and said organoaluminum compound has a molar ratio of Mg:Al from 99:1 to 50:50.

9. A process for homopolymerization of an olefin or copolymerization of at least one olefin with one alpha-olefin to produce polymers which comprises contacting the olefin or the olefin and alpha-olefin, while in the presence of a cocatalyst, with a catalyst composition prepared by a process comprising:
   (a) treating a slurry of PVC-based particles having labile Cl groups in an inert hydrocarbon solvent with a mixture of organomagnesium and organoaluminum compounds under conditions sufficient to form magnesium and aluminum-modified PVC-based particles;
   (b) collecting said modified PVC-based particles of (a);
   (c) reacting a slurry of said modified PVC-based particles of (b) in an inert hydrocarbon solvent with a transition metal compound selected from the group consisting of $TiCl_4$, $VCl_4$, and $ZrCl_4$, in the absence of an electron donor, under conditions sufficient to form chemical bonding between said labile Cl groups and said transition metal compound;
   (d) recovering said catalyst composition.

10. The process of claim 1, wherein the PVC-based particles have a mean particle diameter of 5 to 800 μm, a pore volume of at least 0.1 $cm^3/g$ and a pore radius of 500 to 10,000 angstroms.

11. The process of claim 1, wherein the PVC-based particles have a mean particle diameter of 5 to 800 μm, a pore volume of at least 0.1 cm$^3$/g, a pore radius of 500 to 10,000 angstroms and a molecular weight in the range of 5,000 to 200,000 g/mole.

12. The process of claim 1, wherein said olefins are CH$_2$CHR, wherein R is H or a C$_1$–C$_{10}$ alkyl group, and said alpha-olefin has C$_3$–C$_8$ carbons.

13. The process of claim 12, wherein said alpha-olefins are selected from the group consisting of propylene, 1-butene, 1-pentene, 4-methyl 1-pentene, 1-hexene, 1-heptene or 1-octene and mixtures thereof.

14. The process of claim 1, wherein said polymerization is performed in gas phase, slurry phase or solution phase.

15. The process of claim 1, wherein said polymerization is performed in a temperature range from about 30° C. to about 110° C. and in a pressure range from about 5 bar to about 40 bar.

16. The process of claim 1, wherein said polymer product of said polymerization step has a molecular weight distribution in the range of about 2 to about 10, a molecular weight of about 500 to 900,000 g/mol and a melt flow ratio of from about 15 to about 60.

17. The process of claim 16, wherein said polymer product has a density in the range of from about 0.91 g/cm$^3$ to about 0.97 g/cm$^3$.

18. The process of claim 1, wherein said organomagnesium compound is a reagent with a chemical formula R$_n$MgX$_{2-n}$, R is alkyl group having 1 to 20 carbon atoms, X is halogen and n is 1 or 2.

19. The process of claim 18, wherein the organomagnesium compound is selected from the group consisting of diethylmagnesium, dibutylmagnesium, butylethylmagnesium, dihexylmagnesium, butyloctylmagnesium, ethylmagnesium chloride, butylmagnesium chloride, hexylmagnesium chloride and mixtures thereof.

20. The process of claim 1, wherein said organoaluminum compound is a reagent with a chemical formula RAlX$_{3-n}$, R is alkyl group having 1 to 20 carbon atoms, X is halogen or alkyl group and n is 0, 1, 2 or 3.

21. The process of claim 20, wherein said organoaluminum compound is selected from the group consisting of trialkylaluminum, dialkylaluminum halide, and mixtures thereof.

22. The process of claim 21, wherein said trialkylaluminum is triethylaluminum, triisobutylaluminum, tri n-hexylaluminum and mixtures thereof.

23. The process of claim 1, wherein said PVC-based polymer particles are non-crosslinked polyvinylchloride.

24. The process of claim 1, wherein said cocatalyst is an aluminum compound of the formula R$^5_n$AlX$_{3-n}$ or R$^6$R$^7$Al—O—AlR$^8$R$^9$, R$^5$, R$^6$, R$^7$, R$^8$ and R$^9$ are hydrocarbon groups having 1 to 10 carbon atoms, X is a halogen atom and n is a number satisfying $0 \leq n \geq 3$.

25. The process of claim 24, wherein said cocatalyst is an aluminum compound selected from the group consisting of a trialkylaluminum, a dialkylaluminum halide, an alkylalumoxane, and mixtures thereof.

26. The process of claim 25, wherein said trialkylaluminum is triethylaluminum, triisobutylaluminum, tri n-hexylaluminum and mixtures thereof.

27. The process of claim 26, wherein said cocatalyst is present in an amount of from 1 to 1500 moles of said cocatalyst per one mole of the transition metal compound in said catalyst composition.

28. The process of claim 1, wherein said catalyst is pre-activated with the cocatalyst prior to polymerization to improve product polymer morphology.

\* \* \* \* \*

UNITED STATES PATENT AND TRADEMARK OFFICE
CERTIFICATE OF CORRECTION

PATENT NO.    : 6,448,348 B1                                              Page 1 of 1
DATED         : September 10, 2002
INVENTOR(S)   : Moman et al.

It is certified that error appears in the above-identified patent and that said Letters Patent is hereby corrected as shown below:

<u>Column 6,</u>
Line 49, please delete "at least one" and insert in its place the word -- an --

Signed and Sealed this

Twenty-fourth Day of December, 2002

JAMES E. ROGAN
*Director of the United States Patent and Trademark Office*